April 17, 1962  E. ROESCH  3,030,261
TREAD BUILDER
Filed March 3, 1959  4 Sheets-Sheet 1

INVENTOR.
Ernst Roesch
BY
ATTYS

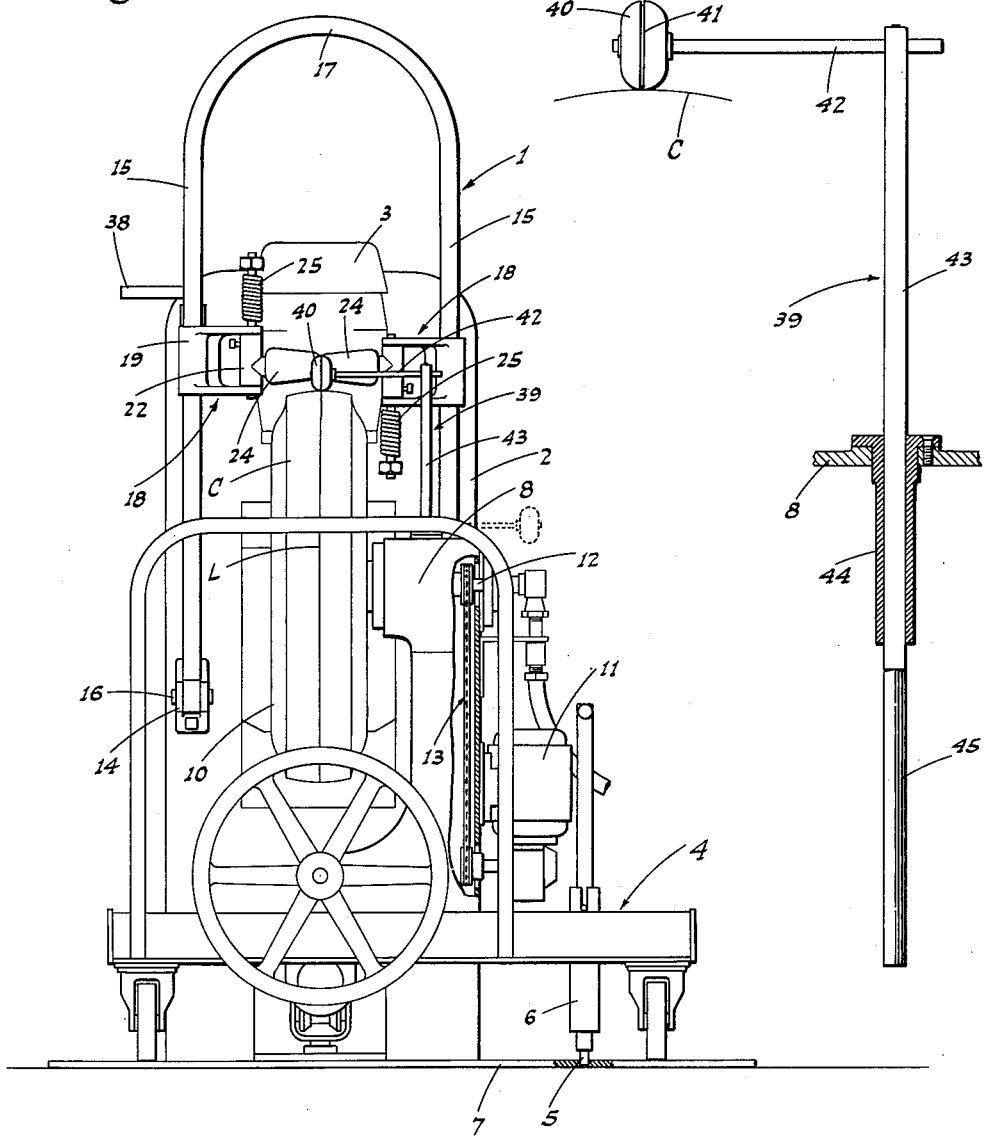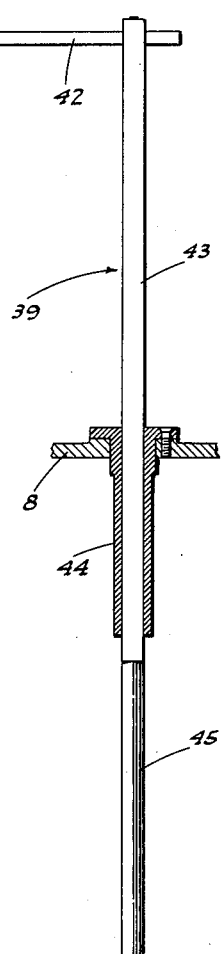

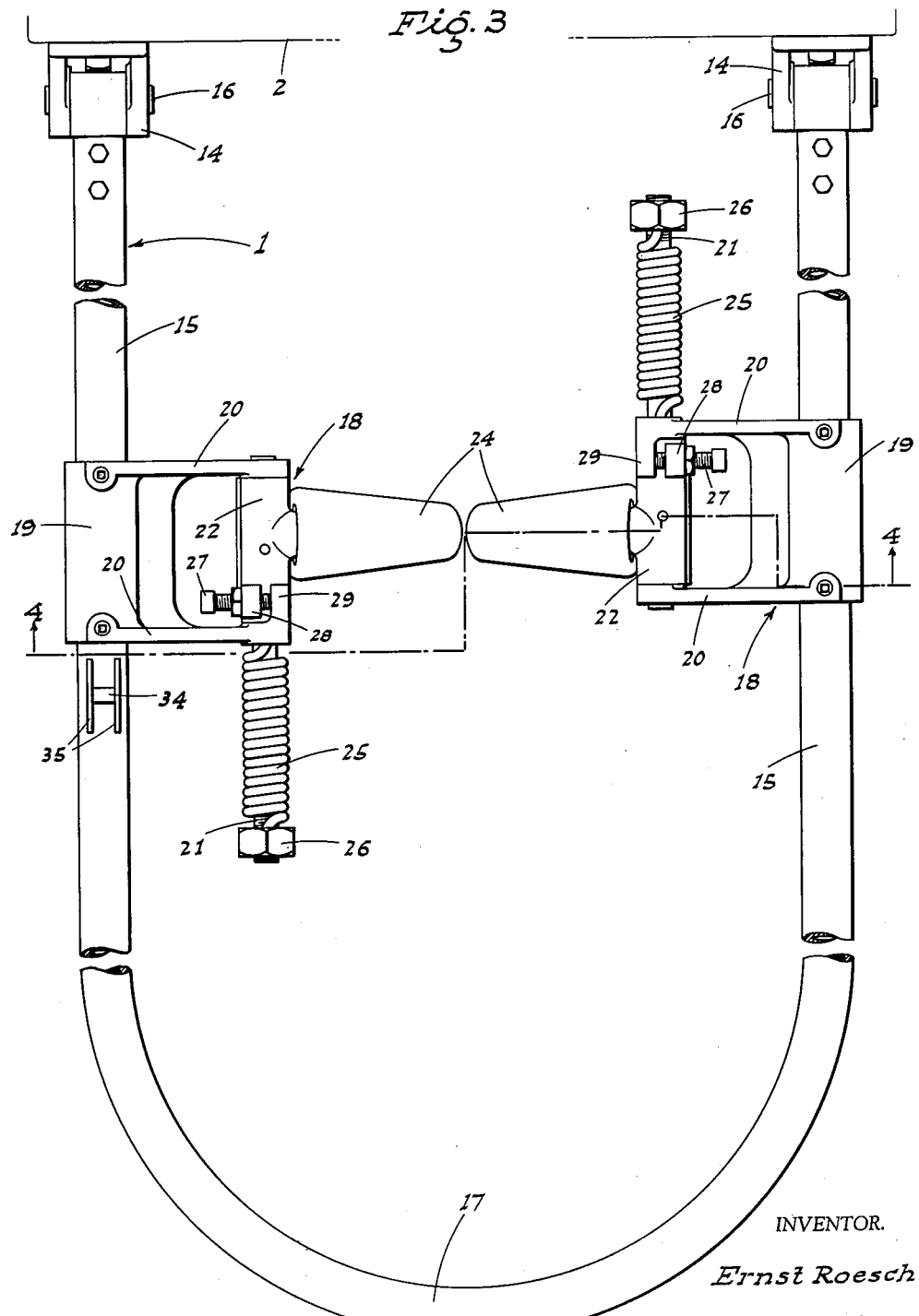

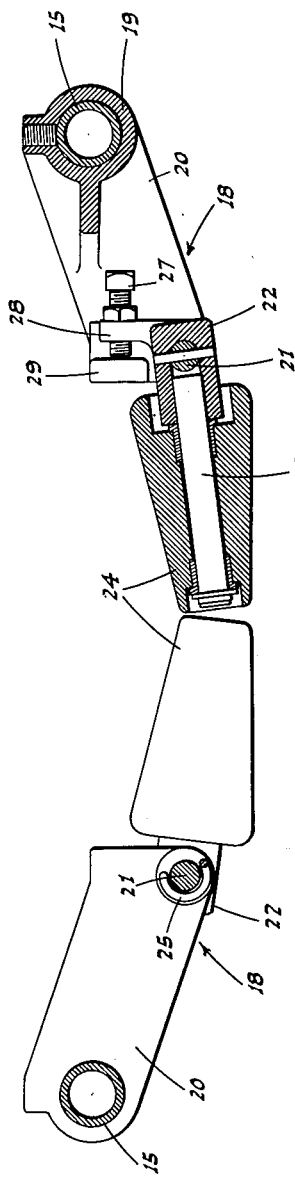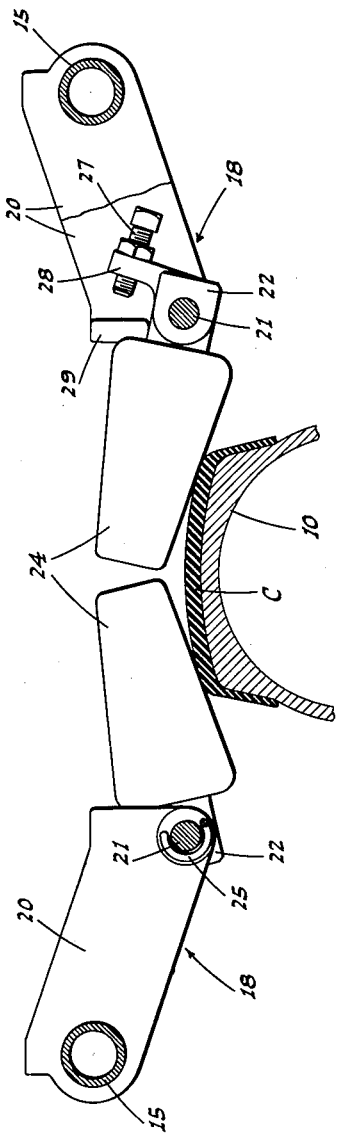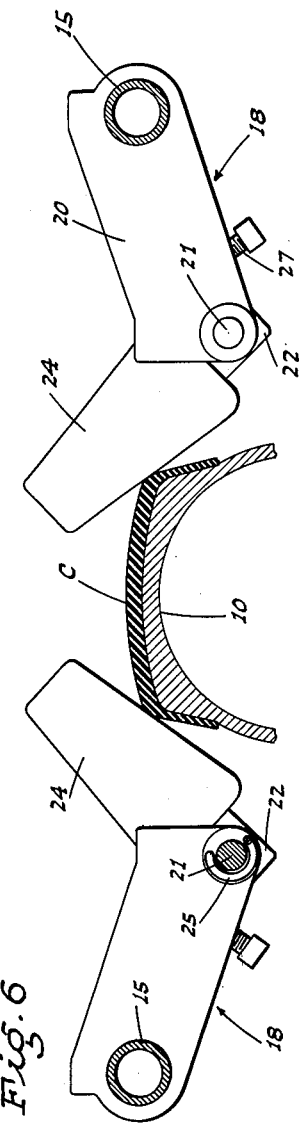

United States Patent Office 3,030,261
Patented Apr. 17, 1962

3,030,261
TREAD BUILDER
Ernst Roesch, Lodi, Calif., assignor to Super Mold Corporation of California, Lodi, Calif., a corporation of California
Filed Mar. 3, 1959, Ser. No. 796,939
4 Claims. (Cl. 156—411)

This invention relates to a device known in the tire retreading industry as a tread builder or stitcher.

Such a device is for the purpose of pressing down or stitching the new tread rubber or camelback as the latter is applied—in the presence of cement—to a pre-buffed tire; the major object of this invention being to provide a device, of such nature, by means of which the desired tread building or stitching operation can be carried out in a fast and efficient manner.

Another object of the invention is to provide the tread builder with tread engaging and pressing rollers so formed and mounted that the gauge, crown, and base of the camelback will not be distorted by the rollers, but instead the camelback will be stitched from the crown to the shoulders swiftly and evenly, and without wrinkling or elongating the new rubber. The dimensions of the camelback are not altered by the operation of the device, and undesirable thinning and bunching of the tread rubber does not occur.

It is also an object of the invention to provide, in association with the tread builder, a camelback centering unit of novel structure and function.

Still another object of the invention is to provide a practical, reliable, and durable tread builder, and one which will be exceedingly effective for the purpose for which it is designed.

These objects are accomplished by means of such structure and relative arrangement of parts as will fully appear by a perusal of the following specification and claims.

In the drawings:

FIG. 2 is a front end elevation of the tread builder and tire buffing machine, partly broken out and in section.

FIG. 3 is an enlarged broken-away plan view of the tread builder.

FIG. 4 is a cross section of the tread builder taken on line 4—4 of FIG. 3, showing the taper rollers in their normal or at-rest position.

FIGS. 5 and 6 are similar views showing the rollers as engaged with the camelback being stitched onto a tire.

FIG. 8 is an enlarged elevation of the camelback centering unit.

Figure 1:
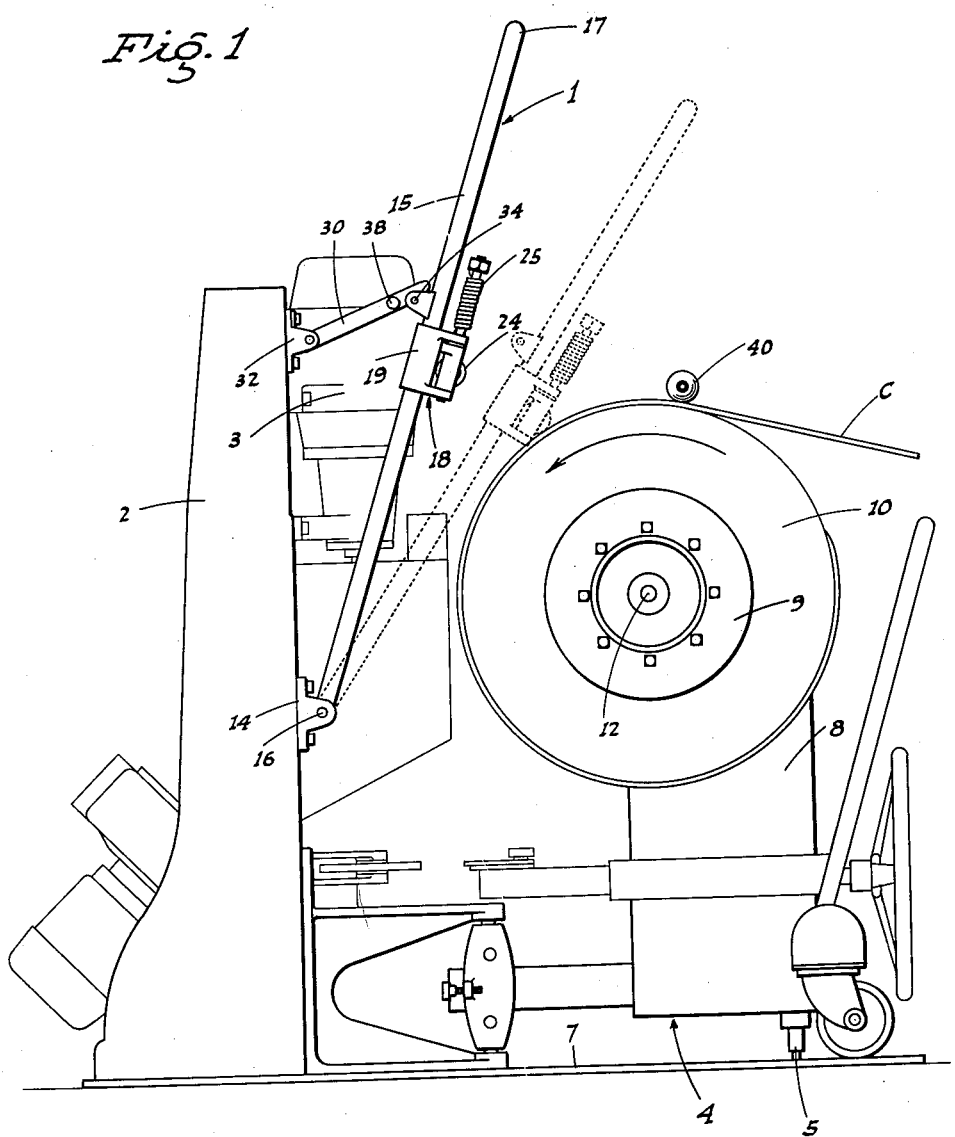
FIG. 1 is a side elevation of the tread builder shown as mounted on a tire buffing machine and in an idle or inoperative position.
Figure 7:
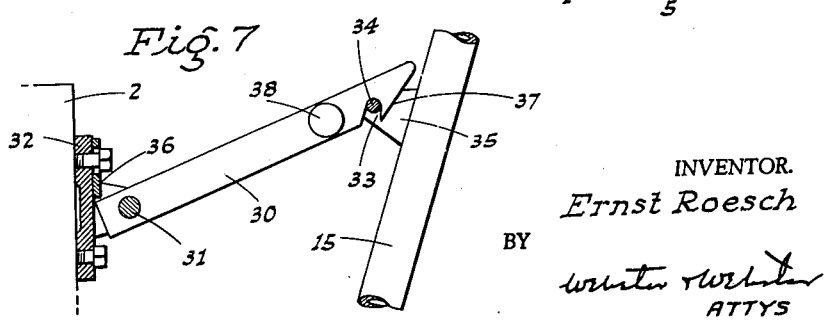
FIG. 7 is an enlarged fragmentary view of the latching unit for the pivoted stitching-roller mount.

Referring now more particularly to the drawings and to the characters of reference marked thereon, the improved tread builder, indicated generally at 1, is here shown as mounted in connection with a tire buffing machine which of itself is the subject of, and is fully shown and described in, copending application, Serial No. 791,906, filed February 9, 1959; now Patent No. 2,985,231.

Such tire buffing machine includes an upstanding fixed frame 2 on the front side of which the drive motor 3 for a buffing rasp (not shown) is mounted, and a carriage, indicated generally at 4, is disposed in front of frame 2 and normally movable toward and from said frame. For the purpose of tread building or stitching, however, the carriage 4 is rigidly held against movement and in a fully retracted position relative to frame 2, by means of a vertical locking rod 5 mounted in a sleeve 6 on the carriage; the rod 5 being engaged at its lower end in a suitably positioned socket formed in a floor plate 7 which is rigid with said frame 2.

The carriage 4 includes an upstanding pedestal 8 which supports a transverse-axis wheel 9 which carries the tire 10 for the tread building operation. The wheel is driven at the desired speed by means of an electric motor 11 secured against the side of the pedestal 8, and connected to the spindle or axle 12 of the wheel by means of a chain drive 13 or the like (see FIG. 2).

Secured on the front side of frame 2, in transversely spaced relation and below the level of the center of the wheel 9 and tire 10, are brackets 14 in which the lower ends of elongated arms 15 are transversely pivoted, as at 16. The arms 15, which incline forwardly and upwardly, are connected at their outer or upper ends by an integral handle bar 17. The length of the arms 15 is such that either when in an up-swing inoperative position or in a down-swung operative position, the handle bar 17 is well above or clear of any wheel-supported tire 10, as shown in FIG. 1. The brackets 14 and arms 15 are disposed relative to the wheel 9 and tire 10 thereon so that the latter is positioned midway between the planes of movement of said arms.

Mounted on the arms 15 intermediate their ends are opposed cooperating stitching units 18, which are duplicates of each other, and hence a description of one such unit will suffice for both.

Each unit 18 comprises a sleeve 19 non-turnably secured on the corresponding arm 15. Radial fingers 20 project laterally from the sleeve 19 in the direction of the opposite unit 18, and at their outer ends said fingers support a rotary cross rod 21 on which, between fingers 20, a sleeve 22 is fixed.

The sleeve 22, intermediate its ends, mounts a spindle 23 projecting laterally toward said opposite unit 18, and on which spindle a taper roller 24 is journaled; the large end of the roller being adjacent the sleeve, and which may be considered its inner end.

The rollers 24 of the two units 18 are alined in a transverse plane at right angles to arms 15, and the length of such rollers is such that they closely approach each other when in their initial or at-rest position, and in which position the lower edge of said rollers is substantially horizontal.

Upward movement of each roller 24 from such position is yieldably resisted by a helical torsion spring 25. Such spring is wound about the portion of rod 21 which projects beyond one of the fingers 20, and at one end the spring is secured to said finger and at the other end to an adjustable head 26 on the outer end of the rod.

Downward movement of each roller 24 below a predetermined at-rest position is prevented by a stop device which comprises an adjustable set screw 27 mounted in a lug 28 projecting upwardly from the related sleeve 22; the screw engaging a stop ear 29 projecting from one of the fingers 20 in overhanging relation to the sleeve and located so that the lug 28 is disposed between the ear and the sleeve 19.

In order to hold the tread builder 1 out of the way and clear of the tire 10 when not in use, a holding link 30 is pivoted transversely, as at 31, on a bracket 32 on the frame 2 in alinement with one arm 15 and well above the corresponding bracket 14. The holding link 30 extends at a forward and upward incline to its outer end, and adjacent such end is formed with a downwardly opening notch 33. The notch 33 releasably engages over a cross pin 34 mounted on and extending between ears 35 secured on said one arm 15 on its rearwardly facing side.

A stop plate 36 secured on the bracket 32 above the link 30 engages the top edge of the same rearwardly of the pivot 31 to prevent downward movement of said link below a position in which—upon upward swinging of the related arm 15—a forwardly and upwardly sloping cam edge 37 at the front end of the link engages the cross pin 34 and lifts the link so that the pin can enter the notch 33. A handle 38 projects laterally out from the link 30 to facilitate manual lifting of the same to disengage the link 30 from the cross pin 34 in advance of use of the tread builder 1.

In order to enable the operator to maintain the camelback C properly centered as such camelback is being wrapped about and adhered to the tire as the latter rotates, a centering unit 39 is provided. This unit, as shown particularly in FIG. 8, comprises a small centering roller 40 adapted to ride on the camelback at the top of the tire; the roller having a central circumferential groove 41 with which the marked center line L on the camelback may be easily alined.

The roller 40 is mounted on one end of a laterally extending arm 42, the other end of which is secured to the upper end of a depending stem 43. For a major portion of its length downwardly from the upper end, the stem 43 is square in cross section and is slidably and nonturnably mounted in a guide sleeve 44 depending from—and supported by—the top of pedestal 8. The length of the square portion of the stem 43 is such that when the roller 40 is engaged with and supported on the camelback C, said square portion is still engaged by the sleeve 44. Below said square portion the stem is formed with a circular portion 45 of a size to rotate in the sleeve 44.

When in use the roller 40 will rest of itself on the camelback by reason of the weight of the centering unit 39 as a whole, and will not deviate from a centralized position relative to the tire by reason of the non-turnable mounting of the stem 43.

When the use of the roller 40 is not desired, the stem 43 may be lifted until the circular portion 45 thereof is engaged in the sleeve 44, whereupon the unit 39 may be turned to dispose the roller laterally away from the tire. The stem may then be allowed to drop, so that the arm 42 will rest on the top of the sleeve 44 and in an out-of-the-way position, as shown in dotted lines in FIG. 2.

After the camelback has been applied to the buffed tire and the guide roller 40 has been moved out of the way, the tread builder 1 is released from the holding link 30 and is swung forwardly and downwardly, by the operator grasping the handle bar 17, until the taper rollers 24 engage the camelback C; the tire being continuously rotated. The rollers 24—when in their initial position, as when the set screws 27 abut the stop ears 29—engage and stitch the camelback at the center of its width.

As downward pressure on the handle bar 17 is exerted by the operator, with resultant and further downward swinging of the tread builder 1, the rollers are simultaneously and progressively tilted upwardly against the resistance of the springs 25, and the area of pressure or stitching engagement of said rollers with the camelback gradually shifts laterally out and away from the center of width of the tire, as shown in FIG. 5. Increased downward pressure on handle bar 17 and the continued downward swinging of the tread builder 1 causes the rollers 24 to tilt more sharply upward, so that they finally engage the tread at its side edges or shoulders, as shown in FIG. 6, and may then be moved further down so that stitching pressure is exerted by said rollers against the sidewall portions of the camelback to complete the stitching thereof on the tire. It is to be noted that the sleeves 22 of the stitching units 18 are spaced sufficiently far apart from each other and from the tire that the rollers 24 may assume a practically vertical position, as is necessary for them to move down and engage the sidewall portions of the camelback.

With a tread builder constructed as described, including the stitching units 18 and the particular taper roller arrangement thereof, camelback can be pressure engaged or stitched on a tire positively, rapidly, and without any distortion, wrinkling, or elongation of the new tread rubber.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention.

Having thus described the invention, the following is claimed as new and useful, and upon which Letters Patent are desired:

1. In a tread builder which includes a pedestal having a rotary horizontal-axis tire-mounting wheel supported thereby whereby camelback may be applied to and about the periphery of the tire as the latter rotates, the camelback having a center line marked thereon; a camelback centering unit mounted on the pedestal and including a center-indicating roller adapted to ride on the camelback, and means mounting the roller in connection with the pedestal for unrestrained vertical movement when in a camelback engaging position and for separate movement between such position and a position laterally offset from the tire and below the camelback engaging position of the roller.

2. A structure, as in claim 1, wherein the roller mounting means comprises a horizontal arm on one end of which the roller is journaled, a stem secured to and depending from the other end of the arm, the upper portion of the stem being non-circular in cross section, a relatively short vertical guide sleeve mounted on the pedestal in laterally offset relation to the wheel at a level below the top thereof, the non-circular portion of the stem being slidable but non-turnable in the sleeve, the stem having a lower portion circular in cross section, and said lower portion of the stem being slidable and turnable in the sleeve.

3. A tread builder comprising a stationary mount, a rotary wheel journaled on the mount and disposed to support a tire vertically for application of camelback to the periphery thereof, and a stitching device arranged in connection with the mount for movement in a direction substantially radially of the wheel and into or from engagement with the applied camelback; said stitching device including transversely spaced arms extending in a plane at right angles to the axis of the wheel and disposed to one side of the same and pivoted at their inner end on the mount parallel to the axis of said wheel, means rigidly connecting the arms together at their outer end stitching rollers normally projecting transversely of the wheel to engage the camelback on each supported tire, and means mounting the roller on the related arm for outward tilting movement in response to the camelback engaging pressure; said mounting means comprising spaced fingers rigid with and projecting from the arm in a direction toward the wheel, a sleeve turnably supported by and extending between the fingers, a spindle rigid with and projecting from the sleeve and on which spindle the roller is turnably mounted in adjacent relationship to the sleeve, and a spring unit individual to and acting on the sleeve to resist rotation of the same in a direction to tilt the roller outwardly from said normal position.

4. A tread builder, as in claim 3, in which said spring unit comprises a rod fixed with the sleeve axially thereof and projecting beyond one of said fingers, and a torque spring on the projecting portion of the rod; one end of the spring being secured to said finger and the other end to the rod.

(References on following page)

References Cited in the file of this patent

UNITED STATES PATENTS

| | | |
|---|---|---|
| 1,327,910 | Harsel | Jan. 13, 1920 |
| 1,331,657 | Macbeth | Feb. 24, 1920 |
| 1,368,393 | Griffiths | Feb. 15, 1921 |
| 1,718,633 | Cardarelli | June 25, 1929 |
| 1,787,413 | Stevens | Dec. 30, 1930 |
| 2,529,739 | Powers | May 13, 1949 |
| 2,556,264 | Flynn | June 12, 1951 |
| 2,734,553 | Rawls | Feb. 14, 1956 |
| 2,737,226 | Jimerson | Mar. 6, 1956 |
| 2,971,563 | Cahill | Feb. 14, 1961 |